United States Patent [19]

Fukazawa et al.

[11] 4,430,658

[45] Feb. 7, 1984

[54] APPARATUS FOR DETECTING DEFLECTION OF A CHARGED INK DROPLET.

[75] Inventors: Takao Fukazawa, Tokyo; Chuji Ishikawa, Kawasaki, both of Japan

[73] Assignee: Ricoh Company, Ltd., Japan

[21] Appl. No.: 384,060

[22] Filed: Jun. 1, 1982

[30] Foreign Application Priority Data

Jun. 1, 1981 [JP] Japan .............................. 56-84183

[51] Int. Cl.$^3$ .............................................. G01D 18/00

[52] U.S. Cl. ...................................................... 346/75

[58] Field of Search .............. 346/75, 140 R; 400/126

[56] References Cited

U.S. PATENT DOCUMENTS 3,866,237 2/1975 Meier .................................... 346/75
4,277,790 7/1981 Heibein et al. ......................... 346/75
4,286,274 8/1981 Shell et al. ............................ 346/75
4,305,079 11/1981 Mix, Jr. ................................ 346/75
4,310,846 1/1982 Horike .................................. 346/75

*Primary Examiner*—Elliot A. Goldberg
*Assistant Examiner*—Todd E. DeBoer
*Attorney, Agent, or Firm*—Guy W. Shoup

[57] ABSTRACT

An apparatus for detecting deflection of a charged ink droplet for use in an ink-jet printer is provided. The present apparatus comprises a support member and an electrode housing containing therein an electrode means for detecting the charge of the ink droplet connected to the support member through a link mechanism, and thus the housing may move relative to the support member. The present apparatus also comprises an adjusting screw which may change the position of the housing relative to the support member after mounting the support member to the base frame of an ink-jet printer. Accordingly, mounting of the present apparatus is greatly facilitated and the electrode assembly may be set in position without difficulty.

5 Claims, 8 Drawing Figures

APPARATUS FOR DETECTING DEFLECTION OF A CHARGED INK DROPLET.

BACKGROUND OF THE INVENTION

1. Field of the Invention

The present invention generally relates to an ink-jet printer and more in particular to an apparatus for detecting deflection of a charged ink droplet for use in an ink-jet printer of the deflection control type.

2. Description of the Prior Art

The conventional deflection control type ink-jet printer is schematically shown in FIG. 1. As shown, the ink-jet printer comprises an ink cartridge 1 from which ink is supplied through a pump 2 to an accumulator 3. Then, the ink under pressure is supplied from the accumulator 3 to an ink-jet head 5 through a filter 4. The head 5 is provided with an electrostrictive vibrator 5*a* which imparts vibration of a constant frequency to the ink under pressure when excited. Thus the vibration-imparted ink under pressure is discharged out of the nozzle of the head 5 in the form of a jet. This ink jet is then regularly separated into ink droplets at a predetermined position in the downstream of the nozzle, whereby the separation frequency coincides with the frequency of the vibration.

A charging electrode 6 is disposed at the position where the ink jet is separated into ink droplets and a potential is applied to the electrode 6 for charging the separated droplets. Such a charging potential is variable in level in a stepwise fashion, and no-recording state, i.e., image signal "0", is defined to be 0 level, e.g., ground potential. Because of the fact that the charging potential must be applied in the form of pulse and that each of the stepped charging potentials must be applied in conformity with the phase of the formation of ink droplets, the phase of the charging potential pulses is set for the excitation phase of the electrostrictive vibrator 5*a* of the head 5 through the charging phase retrieval procedure. That is, the output from a clock pulse generator is supplied to an excitation amplifier 41 which then produces a sinusoidal wave in synchronism with the clock signal, said sinusoidal wave being applied to the electrostrictive vibrator 5*a* of the head.

The output signal from the clock pulse generator is also supplied to a phase control circuit 30 which then produces charging clock pulses having a constant pulse width and a predetermined phase difference with respect to the input clock to the circuit 30. Then the output from the circuit 30 is supplied to a retrieval amplifier 44 which in turn produces retrieving pulses having the same phase as that of the charging clock pulses and a constant level with the polarity either same as or opposite to that of the charging potential. These retrieving pulses are supplied to the charging electrode 6. Then the charge of an ink droplet is detected. That is, it is monitered whether or not a charge detecting circuit has generated a charge detecting signal during production of a predetermined number of ink droplets, and if such a signal has been generated, the phase retrieval procedure is terminated; on the other hand, if such a signal has not been generated, the phase is shifted by one step at the phase control circuit 30 thereby shifting the charging potential pulses over a predetermined phase.

In this manner, upon completion of setting of an appropriate phase for the charging potential pulses with respect to the output clock from the clock pulse generator, charging potential pulses for printing or recording, which are variable in level in a stepwise fashion and wider than the charging potential pulses for phase retrieval located at the center of the pulse width, are applied to the charging electrode 6, so that printing or recording operation takes place. That is, when the charging potential which may vary in level in association with the charging clock signal is applied to the charging electrode, ink droplets are charged in accordance with the level of the charging potential, and, therefore, the ink droplets are deflected through the interaction between the amount of charges of the droplets and the electric field formed between deflection plates $7_1$ and $7_2$. If the image signal is at "0" level, the charging potential is set at "0" level. So, an ink droplet is not charged in this case and therefore it will be collected by a gutter 9.

One of the problems associated with such an ink-jet printer as described above is the deflection error of an ink droplet due to changes in conditions such as temperature and pressure of the ink. Thus, heretofore, various attempts have been made to adjust the charging potential and the temperature and pressure of the ink by detecting the temperature and pressure of the ink, the flying velocity of an ink droplet, and the amount of charge or deflection.

In the system shown in FIG. 1, there are provided three charge detecting electrodes 48*a*–48*c* which are connected to charge detectors 48*a*'-48*c*', respectively. It is so arranged that the output signals from the charge detector 48*a*' and 48*c*' indicate insufficient deflection and excessive deflection, respectively, and the output signal from the charge detector 48*b*' indicates proper deflection, whereby ink pressure and/or charging potential are adjusted such that the charge detector 48*b*' supplies a charge detecting signal. It may be so structured that only one or two charge detecting electrodes are provided. It has also been proposed to change ink pressure and/or charging potential in a manner of geometric series in order to carry out such adjustments quickly. It has also been proposed to use non-contact type detecting electrodes. When use is made of such impingement type or non-contact type deflection detecting electrodes, accuracy in arrangement is critical because the print dot distribution and dot shift are influenced by the arrangement of the electrodes. Moreover, when an ink droplet impinges upon the detecting electrode, ink splashes are scattered around thereby making the detecting electrode leaky and thus allowing to carry out only inaccurate detection. In the prior art, the detecting electrodes are also prone to produce noises due to external noise source or ON/OFF operation of the charging potential.

SUMMARY OF THE INVENTION

The disadvantages of the prior art are overcome with the present invention and there is provided an improved apparatus for detecting deflection of a charged ink droplet comprising a housing provided with a window for the passage of the charged ink droplet therethrough; electrode means disposed inside the chamber defined by the housing for detecting the charge of the charged ink droplet; support means for supporting the housing; biasing means for normally biasing the housing generally in the direction of deflection of the charged ink droplet; and adjusting means for adjustably restraining the movement of the housing against the force applied by the biasing means.

In a preferred form of the present invention, the housing is generally in the form of a box and provided with a window through which a charged ink droplet may come into the chamber defined by the housing. An electrode means for detecting the charge of an incoming charged ink droplet to determine the trajectory or deflection of the droplet is disposed in the chamber defined by the housing. Preferably, the electrode means comprises a first electrode assembly located in the downstream of the window of the housing with respect to the motion of the ink droplet and a second electrode assembly located in the downstream of the first electrode assembly. Preferably, the second electrode assembly is spaced apart from the first electrode assembly with a particular angular relationship with respect to the horizontal line, thereby allowing to determine appropriateness of the trajectory or deflection of the incoming charged ink droplet.

A preferred form of each of the first and second electrode assemblies includes a support rod, an ink droplet impinging portion provided at the forward end of the support rod, and a screw portion provided at the base end of the rod. When these electrode assemblies are fixed to the housing, they are so arranged that the window of the housing and the ink droplet impinging portions of the electrode assemblies all lie on the same flat plane which includes the deflecting trajectory of the incoming charged ink droplet. Moreover, each of the electrode assemblies preferably includes a shielding disk disposed in the vicinity of the ink droplet impinging portion. The shielding disk must be large enough to prevent ink splashes, produced when the incoming ink droplet impinges upon the impinging portion of the electrode assembly, from being scattered particularly in the direction towards the base end of the support rod.

The housing for housing therein the electrode means is connected to the support means preferably through a link mechanism. The housing is spring-biased in a predetermined direction to bring the housing in pressure contact against the adjusting means, preferably a screw. Thus, by simply rotating the screw, the position of the housing may be easily adjusted. In this manner, since the position of the housing relative to the support may be adjusted, there is an increased freedom in mounting the present apparatus in an ink-jet printer. Stated differently, the present apparatus, or the electrode means may be located at a desired position with upmost accuracy and ease.

Therefore, it is a primary object of the present invention to provide an apparatus for detecting deflection of a charged ink droplet which may be easily mounted in a recording system such as an ink-jet printer.

Another object of the present invention is to provide an apparatus for detecting deflection of a charged ink droplet which allows to locate the electrode means at a desired position accurately without difficulty.

A further object of the present invention is to provide an apparatus for detecting deflection of a charged ink droplet which is simple in structure and thus easy to manufacture.

Other objects, advantages and novel features of the present invention will become apparent from the following detailed description of the invention when considered in conjunction with the accompanying drawings.

DESCRIPTION OF THE PREFERRED EMBODIMENTS

Figure 2:
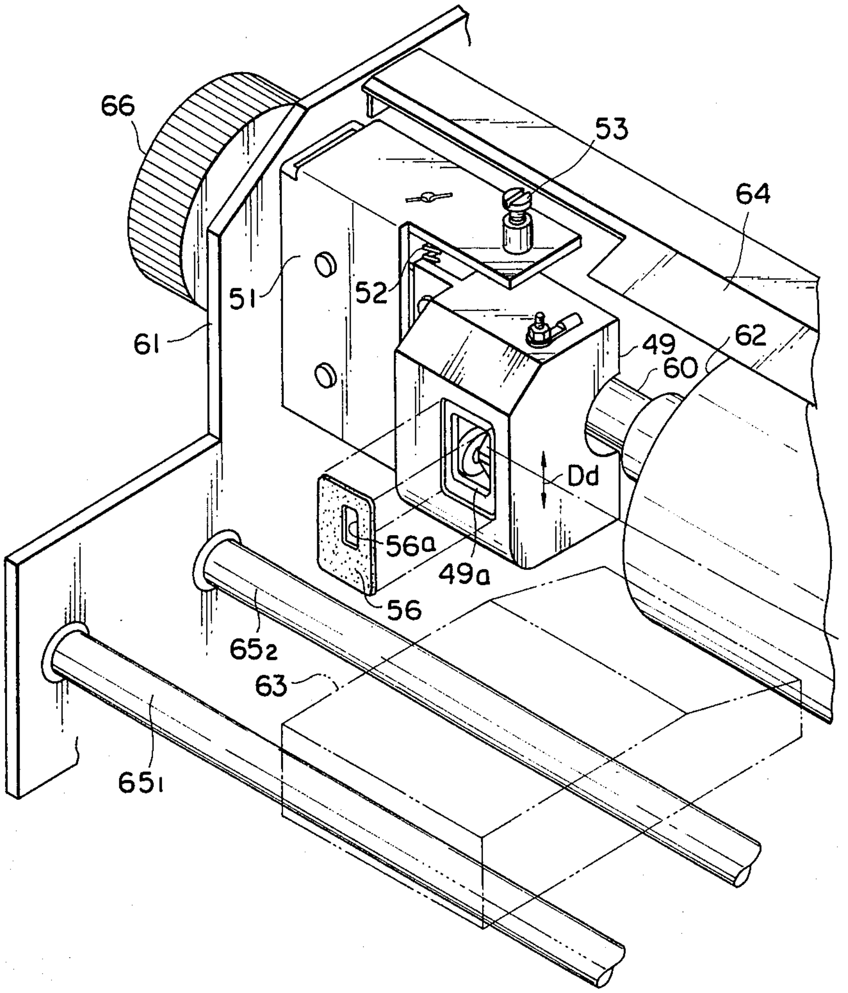
FIG. 2 is a perspective view of the present apparatus showing the condition when mounted in an ink-jet printer.

Referring now to FIG. 2, there is shown the present apparatus generally comprised of an electrode housing 49 housing therein a pair of detecting electrodes and a support member 51 which adjustably supports the housing 49 in the condition when mounted in an ink-jet printer. As will be described in detail later, a coil spring 52 is extended between the support member 51 and the housing 49 so that the housing 49 is normally biased upwardly and thus the top surface of the housing is brought into pressure contact against the bottom end of a screw 53. The housing 49 is generally in the shape of a box and provided with a window **49*a* on one side wall thereof. In FIG. 2, a porous conductive plate 56, which will be described later, is shown as removed from the window 49*a*. The plate 56 is provided with an opening 56*a* through which a charged ink droplet is directed into the chamber defined by the housing 49**.

As partly shown in FIG. 2, the back side of either of the housing 49 and the support member 51 is provided with a semi-circular recess which allows to place a platen shaft 60 partly therein. As shown, the support member 51 is fixedly mounted on a base frame 61 by means of appropriate fixing means such as screws. It should be noted that the position of the housing 49 may be adjusted with respect to the support member 51 by rotating the screw 53 and thus there must be provided an enough gap between the recess of the housing 49 and the platen shaft 60.

Figure 1:
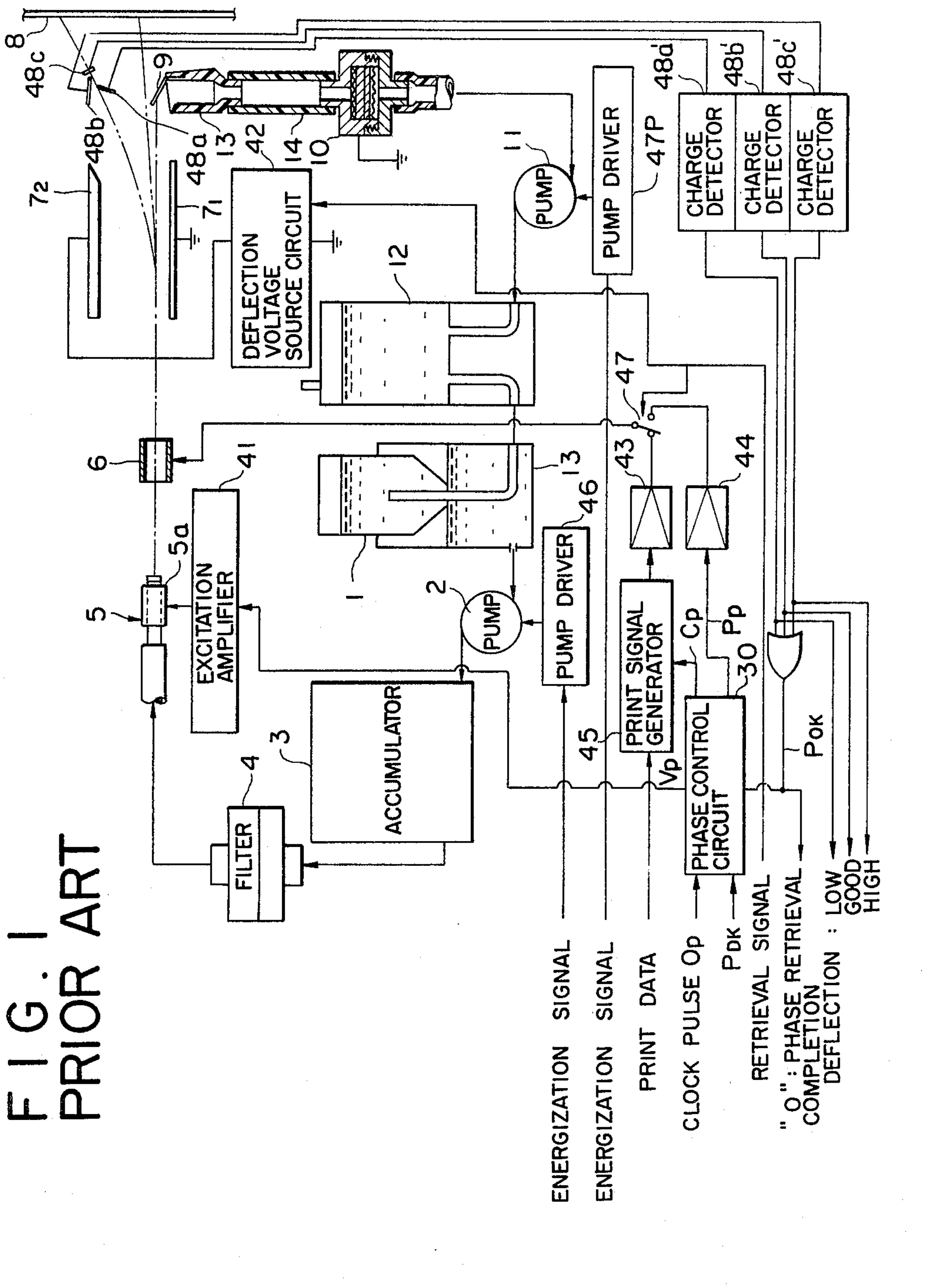
FIG. 1 PRIOR ART
FIG. 1 is a schematic illustration partly in blocks showing one example of the deflection control type ink-jet printer.

As shown by the phantom line in FIG. 2, there is provided an ink-jet head assembly 63 which may move along and in parallel with a platen 62 as riding on a carriage (not shown), the reciprocating motion of which is guided by a pair of guide bars $\mathbf{65_1}$ and $\mathbf{65_2}$. The ink-jet head assembly 63 includes such elements as head 5, charging electrode 6, deflection electrodes $\mathbf{7_1}$, $\mathbf{7_2}$ and gutter 9, which are all shown in FIG. 1. The ink-jet head assembly 63 moves along the guide bars $\mathbf{65_1}$ and $\mathbf{65_2}$ and its home position is defined at the position where the ink nozzle of the head assembly 63 is directly opposite to the window **49*a* of the present detecting apparatus. Thus, when the ink-jet head assembly 63** is in home position, for example prior to initiation of printing and upon completion of certain printing, ink droplets discharged from the nozzle of the ink-jet head assembly 63 will pass through the window 49*a* and enter into the chamber defined by the housing 49. Besides, while the ink-jet head assembly 63 is in home position, the recording position or the amount of deflection is detected and adjustments are carried out to set the amount of deflection to a desired value. Also shown in FIG. 2 are a paper guide 64 and a platen knob 66 attached to the end of the platen shaft 60.

Figure 3:
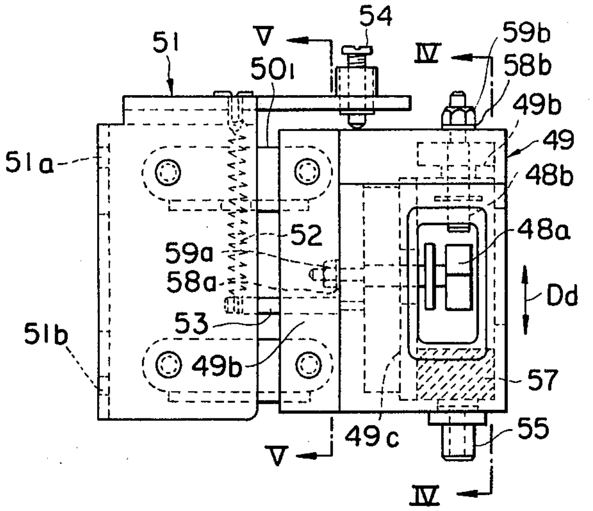
FIG. 3 is a front view showing one embodiment of the present invention.
Figure 4:
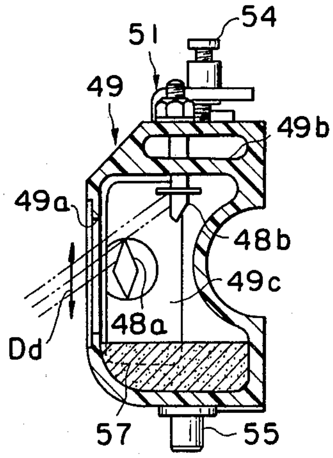
FIG. 4 is a cross-sectional view taken along IV—IV line in FIG. 3.
Figure 5:
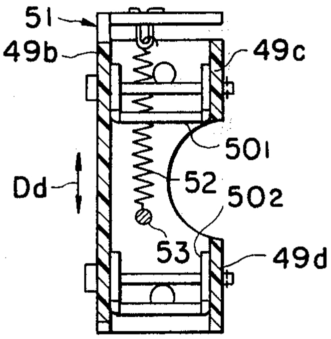
FIG. 5 is a cross-sectional view taken along V—V line in FIG. 3.

FIGS. 3 through 5 show the detailed structure of one embodiment of the present detecting apparatus. The electrode housing 49 provided with the window 49*a* is preferably made of a synthetic resin and it houses therein a pair of charge detecting electrode assemblies 48*a* and 48*b* with a particular relative positional relationship therebetween and with respect to the window 49*a*. One end of the electrode assembly 48*a* is fixed to the sidewall of the housing 49 and it extends horizontally inside the chamber of the housing 49; whereas, one end of the electrode assembly 48*b* is fixed to the ceiling of the housing 49 and it extends vertically inside the chamber.

As best shown in FIG. 3, the electrode assemblies 48*a* and 48*b* are so arranged that their ink droplet impinging portions 48*a*1 and 48*b*1 (see FIGS. 6 and 7) are generally aligned with the trajectory of a charged ink droplet. As shown in FIG. 4, the electrode assembly 48*a* is disposed in the downstream of the window 49*a* with respect to the advancing direction of a charged ink droplet. The other electrode assembly 48*b* is disposed in the downstream of the electrode assembly 48*a* and the forward end or ink droplet impinging portion of the electrode assembly 48*b* is located above the forward end or ink droplet impinging portion of the electrode assembly 48*a*. Thus, a charged ink droplet which is being deflected and enters into the chamber of the housing 49 may impinge upon either one or both of the impinging portions of the electrode assemblies 48*a* and 48*b*. It is to be noted that when ink droplets impinge upon only the electrode assembly 48*a*, it indicates an insufficient or low deflection; whereas, when ink droplets impinge upon only the electrode assembly 48*b*, it indicates an excessive or high deflection. On the other hand, when the impingement of ink droplets is switched from either one of the electrode assemblies 48*a* and 48*b* to the other, it indicates that the amount of deflection is proper or good.

Figure 6:
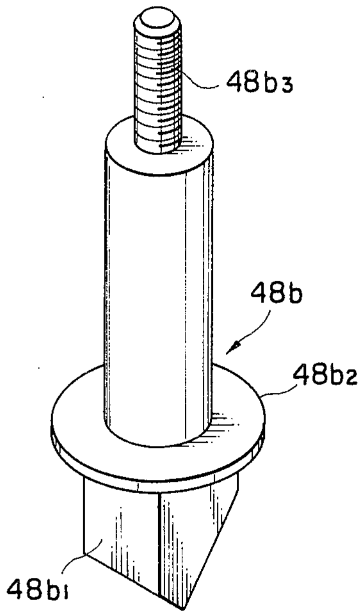
FIG. 6 is a perspective view showing one electrode assembly forming a part of the present apparatus.

As shown in FIG. 6, the electrode assembly 48*b* comprises a support rod, an ink droplet impinging portion 48*b*1 provided at the forward end of the support rod, and a threaded portion 48*b*3 provided at the base end of the support rod. A shielding disc 48*b*2 is also provided adjacent to the impinging portion 48*b*1. When mounting the electrode assembly 48*b* to the housing 49, the threaded portion 48*b*3 is passed through a big hole formed in a top partition 49*b* and a small hole formed in the ceiling of the housing 49 from the chamber of the housing 49 to outside and a nut 59*b* is screwed onto the threaded portion 48*b*3 with an electrode terminal 58*b* sandwiched therebetween. Thus, by tightening the nut 59*b*, the electrode assembly 48*b* is fixed to the housing 49 in such a manner to depend vertically from the ceiling of the housing 49.

Figure 7:
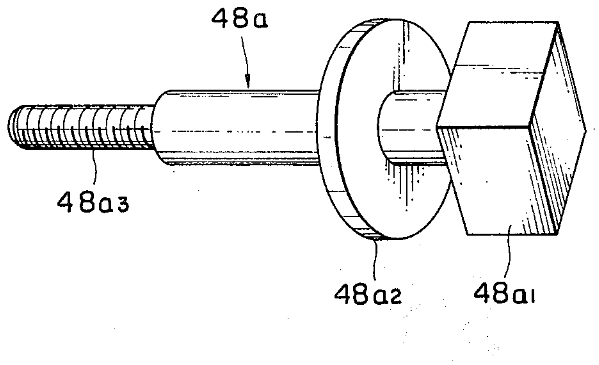
FIG. 7 is a perspective view showing another electrode assembly forming also a part of the present apparatus.

On the other hand, as shown in FIG. 7, the other electrode assembly 48*a*, which extends horizontally inside the chamber of the housing 49, includes a support rod, an ink droplet impinging portion 48*a*1 provided at the forward end of the support rod and a threaded portion 48*a*3 for mounting provided at the base end of the support rod. The electrode assembly 48*a* also includes a shielding disc 48*a*2 for preventing ink splashes, formed when an ink droplet impinges upon the portion 48*a*1, from being scattered toward the base end. When mounting the electrode assembly 48*a* on the housing 49, the threaded portion 48*a*3 is passed through a big hole provided in a side partition 49*c* and a small hole provided in the sidewall of the housing 49 from the chamber of the housing 49 to outside and a nut 59*a* is screwed onto the threaded portion 48*a*3 with an electrode terminal 58*a* sandwiched therebetween. Thus, by tightening the nut 59*b*, the electrode assembly 48*a* may be fixedly mounted to the housing 49 in a cantilever fashion such that it extends horizontally inside the chamber of the housing 49.

Inside and on the bottom of the chamber of the housing 49 is provided an ink absorbing member 57 of a porous material including fabrics. As shown in FIG. 4, the electrode assembly 48*b* is disposed as spaced apart from the electrode assembly 48*a* not only in the horizontal direction but also in the vertical or deflecting direction $D_d$. Thus, when an ink droplet impinges upon the electrode assembly 48*b*, it drips to the ink absorbing member 57 on the bottom wall of the housing 49 without impinging upon the other electrode assembly 48*a*. A drain hole (not shown) is provided in the bottom wall of the housing 49 to be in communication with the chamber of the housing 49 and an outlet 55 is fitted into the drain hole. An appropriate tubing may be fitted onto the outlet 55 thereby leading the ink coming out of the chamber of the housing 49 through the ink absorbing member 57 to a desired location.

Figure 8:
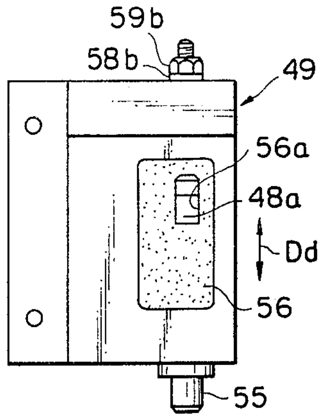
FIG. 8 is a front view of the housing with porous conductive plate 56 attached thereto, said housing forming a part of the present apparatus.

The porous conductive plate 56 is made of a porous stainless steel material usually used to form an ink filter and it is provided with an opening 56*a* for passage of an ink droplet therethrough when the plate 56 is mounted on the housing 49 over the window 49*a*, as shown in FIG. 8. Such a plate 56 functions to absorb ink mist and to shield against external noises and fluctuations in the electric field due to ON/OFF operation of the charging potential.

Referring back to FIGS. 3 and 5, a pair of link arms $50_1$ and $50_2$, arranged in parallel, are extended between the housing 49 and the support member 51 with their ends pivoted thereto. Accordingly, the housing 49 may move with respect to the support member 51 generally in the deflecting direction $D_d$ without self-rotation.

As best shown in FIG. 5, the support member 51 has a top plate and a coil spring 52 is extended between the top plate of the support member 51 and a pin 53 firmly planted in the housing 49. With such an arrangement, the housing 49 is normally urged upwardly due to the recovery force of the coil spring 52. However, as shown in FIGS. 3 and 4, the top plate of the support member 51 is provided with an adjusting screw 54 with its forward end projecting downwardly from the top plate, so that the top surface of the housing 49 is pressed against the forward end of the screw 54.

Under the circumstances, by turning the screw 54 in such a manner that it further projects out of the top plate of the support member 51, the housing 49 moves downwardly relative to the support member 51 against the force of the spring 52; on the other hand, by turning the screw 54 in the opposite direction, the housing 49 moves upwardly relative to the support member 51 with the help of the force of the spring 52.

As shown in FIG. 3, the support member 51 is provided with a pair of threaded holes 51*a* and 51*b*. Thus, bolts may be screwed into these holes 51*a* and 51*b* for fixedly mounting the support member 51 to the base frame 61. Thereafter, the housing 49 may be set in position simply by turning the adjusting screw 54.

As described above, the present detecting apparatus may be easily mounted to the base frame, and thereafter the electrode housing 49 may be set in position simply by turning the screw 54. Besides, in accordance with the present invention, ink splashes generated when an ink droplet impinges upon the electrode assembly 48*a* or 48*b* at the time of detecting, adjusting or setting the amount of deflection are confined within the housing 49 and they will be collected by the porous ink absorbing member 57 and the porous conductive plate 56. Moreover, ink splashes are prevented from being scattered toward the base end of the electrode assembly 48*a* or 48*b* because of the provision of the shielding disc 48*a*2 or 48*b*2, so that the base end section of the electrode assembly 48*a* or 48*b* and the surface of the wall to which the electrode assembly 48*a* or 48*b* is mounted will not receive ink splashes, thereby preventing the electrode assembly from becoming leaky. Provision of the ink absorbing member 56 and porous conductive plate 57 impregrated with ink will help reduce electric field fluctuations caused by external noises and ON/OFF operation of the charging potential.

While the above provides a full and complete disclosure of the preferred embodiments of the present invention, various modifications, alternate constructions and equivalents may be employed without departing from the true spirit and scope of the invention. For example, three or more electrode assemblies may be provided in the housing 49 or only a single electrode assembly may be provided. Moreover, instead of the coil spring 52 in tension, use may be made of a compression coil spring or leaf spring disposed between the bottom surface of the housing 49 and a bottom plate attached to the bottom surface of the support member 51, thereby resiliently urging the housing 49 against the forward end of the adjusting screw 54. Therefore, the above description and illustration should not be construed as limiting the scope of the invention, which is defined by the appended claims.

What is claimed is:

1. Apparatus for detecting deflection of a charged ink droplet comprising:

a housing provided with a window for the passage of said charged ink droplet therethrough;

electrode means disposed inside the chamber defined by said housing for detecting the charge of said charged ink droplet;

support means for supporting said housing;

biasing means for normally biasing said housing generally in the direction of deflection of said charged ink droplet; and adjusting means for adjustably restraining the movement of said housing against the force applied by said biasing means.

2. The apparatus of claim 1 wherein said housing is supported by said support means through a link mechanism in such a manner that said housing is movable generally in the direction of deflection of said charged ink droplet.

3. The apparatus of claim 1 wherein said biasing means includes a coil spring having one end connected to said support means and the other end connected to said housing thereby said housing is biased in a predetermined direction by the spring force of said coil spring.

4. The apparatus of claim 1 wherein said adjusting means includes a screw adjustably threaded into a part of said support means, whereby said housing is brought into pressure contact with the forward end of said screw under the biasing force applied by said biasing means.

5. The apparatus of any one of claims 1 through 4 wherein said electrode means includes first and second electrodes which are spaced apart from each other not only in the horizontal direction but also in the deflecting direction which is normal to said horizontal direction.

* * * * *